(No Model.)

A. C. BARLER.
FLOUR SIFTING SCOOP.

No. 318,680. Patented May 26, 1885.

Witnesses:
W. L. Baker,
D. H. Fletcher.

Inventor:
Augustus C. Barler,
per. Gridley & Fletcher
Attorneys.

United States Patent Office.

AUGUSTUS C. BARLER, OF CHICAGO, ILLINOIS, ASSIGNOR, BY MESNE ASSIGNMENTS, OF ONE-HALF TO ELBRIDGE R. BURLEY, OF SAME PLACE.

FLOUR-SIFTING SCOOP.

SPECIFICATION forming part of Letters Patent No. 318,680, dated May 26, 1885.

Application filed May 31, 1884. (No model.)

*To all whom it may concern:*

Be it known that I, AUGUSTUS C. BARLER, of Chicago, in the county of Cook and State of Illinois, have invented a new and useful Improvement in Flour-Sifting Scoops, of which the following is a description, reference being had to the accompanying drawings, in which—

Figure 1:
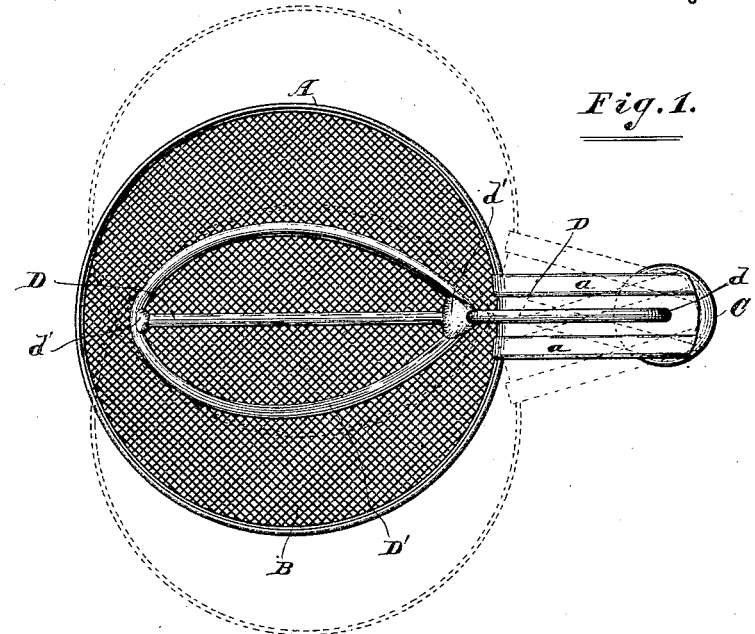
Figure 2:
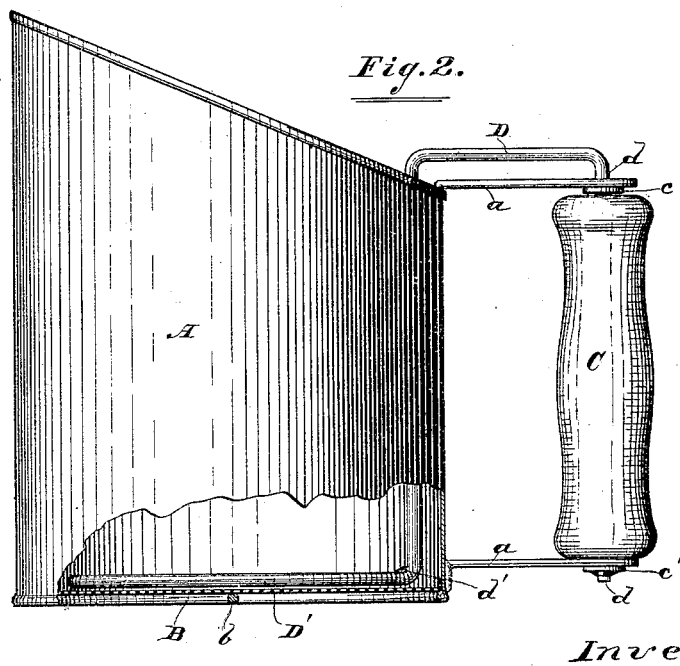

Figure 1 is a plan view of said scoop, and Fig. 2 is a side view with a portion broken away to show the interior.

Like letters of reference indicate like parts in both figures.

The object of my invention is to provide a combined scoop and sifter for dipping flour or other pulverized material and sifting the same directly and automatically therefrom without extra appliances, all of which will be hereinafter more fully described, and definitely pointed out in the claims.

In the drawings, A represents the scoop or dipper, having a sieve, B, permanently secured in any well-known manner to the bottom thereof, and preferably re-enforced by one or more cross-wires, b.

Brackets or handle-supports a a, extending from the rear of the scoop in the usual manner, are rigidly secured by solder or rivets to the body of the scoop, as shown.

A handle, C, of wood or other suitable material, is pivotally secured to the extremities of the rigid supports or brackets a a, preferably by means of a wire, d, passing through said handle and made rigid therewith, for the purposes hereinafter shown. Washers c c', placed beneath the respective supports a a, serve to form bearing-surfaces and to prevent wear upon the wood. The wire d may be rigidly secured to the handle by first soldering it to the washer c, and inserting one or more brads through said washer into said handle.

For the purpose of agitating the flour or other pulverized material immediately above the sieve, in order to cause the same to sift through the latter, I cause the wire d d, forming the axis of the handle, to be continued from the top and bent forward, forming the extension D, which is continued downward within the scoop, as shown, until it reaches the bottom thereof, when it is extended across or nearly across said bottom, preferably parallel with and nearly touching said sieve. An additional wire, D', which I prefer to bend in an elliptical form, is soldered at d' d' to said cross-extension D, thus covering a larger surface of the sieve; or the wire D may be made somewhat longer and bent in a like or similar form, if desired.

As the supports a a are rigidly secured upon the axis of the handle C, and as the parts D D' form a rigid extension of the handle C, it follows that the latter will remain stationary so long as said handle is firmly grasped, while the scoop A is capable of a lateral movement. When said handle, therefore, is held securely and shaken laterally, the sieve is vibrated beneath the part D', and assumes alternately the respective positions with respect to the horizontal extension or part D', as indicated by the dotted lines in Fig. 1, thereby agitating the flour and causing the same to sift through the sieve.

If desired, the supports a a may be made detachable; but I prefer to make them rigid, as shown.

It is apparent that said sifter is purely automatic in its action, and may be used with one hand.

Having thus described my invention, what I claim, and desire to secure by Letters Patent, is—

1. A flour-sifting scoop consisting of a dipper having a sieve-bottom and a handle pivotally supported in rigid brackets, said handle being provided with a wire fixed thereto, and extending forward and downward within the scoop and across the bottom thereof, substantially as and for the purposes set forth.

2. A flour-sifting scoop consisting of a dipper having a sieve-bottom and an upright handle pivotally supported in rigid brackets or bearings extending outwardly therefrom, said handle being provided with a wire rigidly fixed thereto, and bent forward and downward within the scoop and across the bottom thereof one or more times, whereby the lateral movement of said scoop will cause the flour to sift through said sieve by being brought in contact with said wire extension, substantially as described.

3. In a flour-sifting scoop, the combination of the sieve-bottomed cup A, handle-supports a a, and pivoted handle C, with rigid wire extension D D', substantially as and for the purposes set forth.

AUGUSTUS C. BARLER.

Witnesses:
M. M. GRIDLEY,
D. H. FLETCHER.